United States Patent

Horwill et al.

[11] Patent Number: 5,872,656
[45] Date of Patent: Feb. 16, 1999

[54] VEHICLE BODY ACCESSORIES

[75] Inventors: Gregory Miles Horwill; Rodney Edward Horwill, both of Queensland, Australia

[73] Assignee: Oakmoore Pty. Ltd., Australia

[21] Appl. No.: 723,965

[22] Filed: Sep. 26, 1996

[51] Int. Cl.⁶ .............................. G02B 27/00; G02B 5/08; G02B 21/00; G02B 27/14
[52] U.S. Cl. .................. 359/601; 359/608; 359/609; 359/610; 359/614; 359/636; 296/180.1; 296/96.1
[58] Field of Search ...................... 359/601, 608, 359/609, 610, 614, 636; 296/95.1, 96.18, 96.19, 97.2, 97.3, 901, 211, 215, 180.1, 91.19, 97.1; 362/80, 80.1

[56] References Cited

U.S. PATENT DOCUMENTS

| | | | |
|---|---|---|---|
| D. 263,426 | 3/1982 | Sportelli | D26/122 |
| D. 289,087 | 3/1987 | Kobata | D26/120 |
| 3,444,919 | 5/1969 | Karoll | 160/184 |
| 3,453,039 | 7/1969 | Osborne | 359/593 |
| 4,261,649 | 4/1981 | Richard | 359/614 |
| 4,558,401 | 12/1985 | Tysoe | 362/290 |
| 4,750,812 | 6/1988 | Muraoka et al. | 359/601 |
| 4,772,097 | 9/1988 | Takeuchi et al. | 359/894 |
| 5,014,758 | 5/1991 | Stinson | 150/168 |
| 5,055,982 | 10/1991 | Johnson | 362/61 |
| 5,284,376 | 2/1994 | Zweigart | 296/96.19 |
| 5,292,168 | 3/1994 | Mykytiuk et al. | 296/97.8 |
| 5,324,568 | 6/1994 | Coninx et al. | 296/96.13 |
| 5,513,892 | 5/1996 | Thomas | 296/97.2 |

*Primary Examiner*—Cassandra C. Spyrou
*Assistant Examiner*—Mohammad Y. Sikder
*Attorney, Agent, or Firm*—Finnegan, Henderson, Farabow, Garrett, & Dunner, L.L.P.

[57] ABSTRACT

Vehicle body accessories are formed of a transparent plastic material, and having markings defining a repeating pattern of opaque and transparent regions on one side of the transparent plastic material. The markings reduce the amount of light transmitted through the accessory, and give to the accessory an aesthetically pleasing appearance. The accessory can be used as a headlight cover, a tail light cover, a side window protector, a rear window protector, or a hood protector.

11 Claims, 5 Drawing Sheets

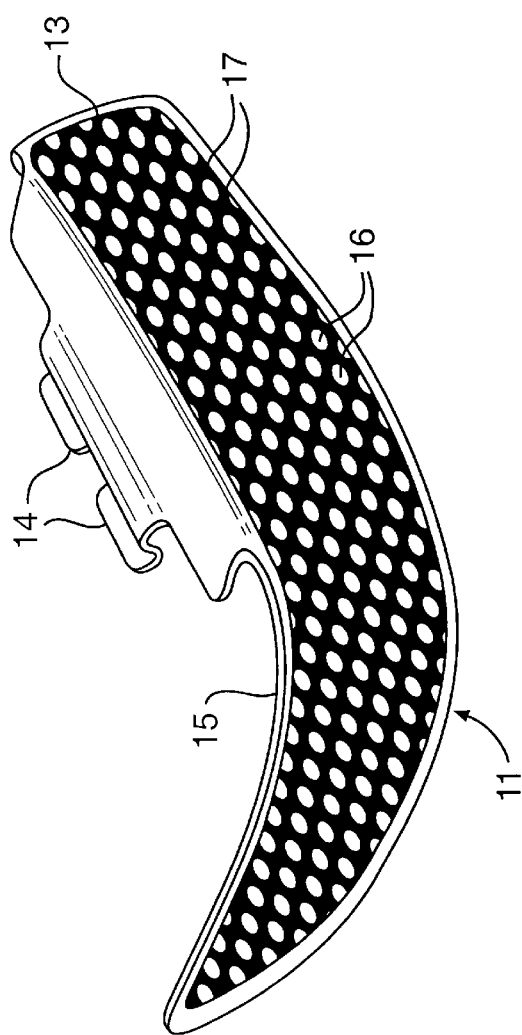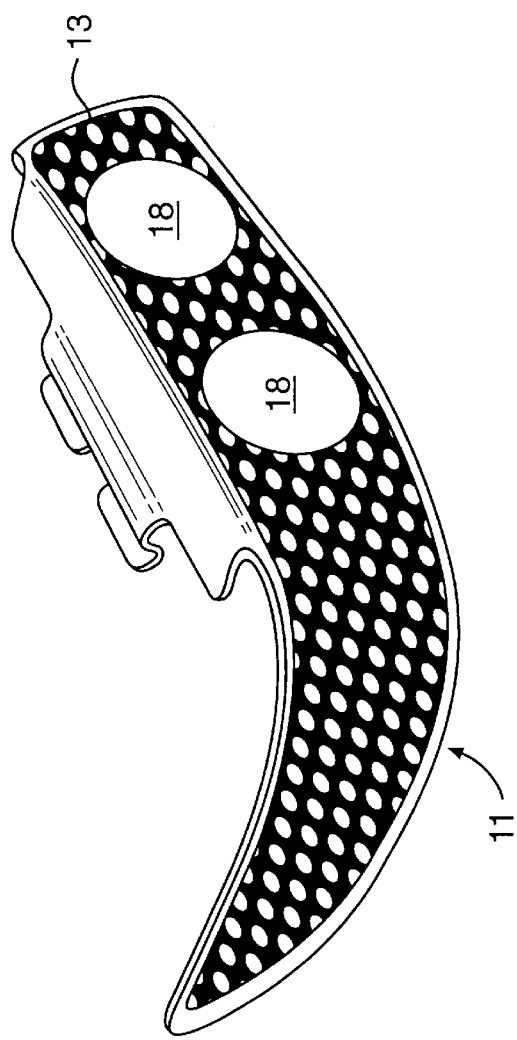

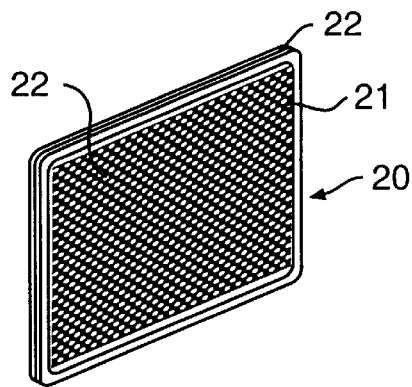
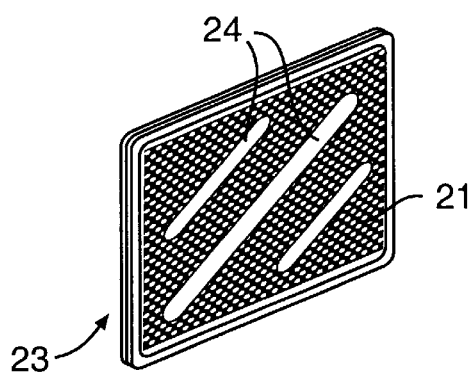
FIG. 4  FIG. 5
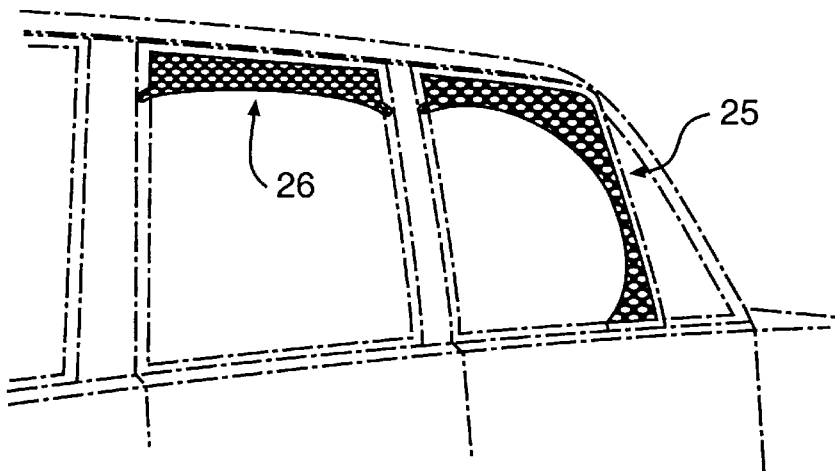
FIG. 6
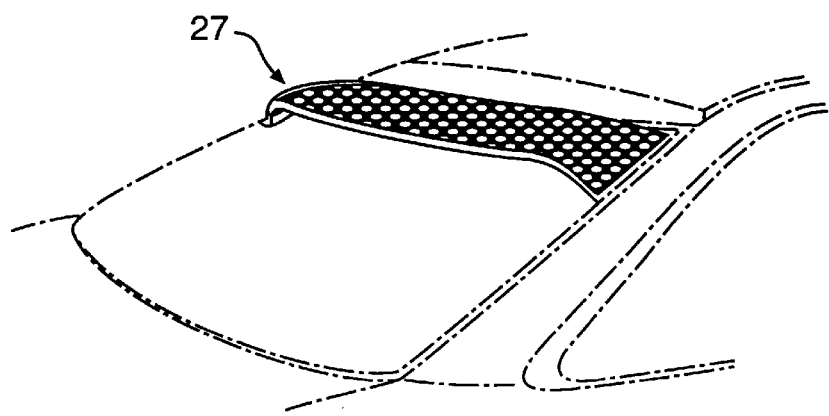
FIG. 7

VEHICLE BODY ACCESSORIES

TECHNICAL FIELD

This invention relates to improvements to vehicle body accessories and in particular to shaped plastics vehicle body accessories, such as headlight and tail-light guards and protectors, vehicle bonnet protectors and deflectors, vehicle side window deflectors and vehicle rear window visors or deflectors.

BACKGROUND ART

Protectors and guards for vehicle headlights of many different designs are currently available and in use. In the case of headlights, the guards or protectors are usually formed of a plastics or acrylic material and shaped such as to conform substantially to the shape of the vehicle headlight. Commonly such guards or protectors have integrally formed clipping members which permit the guard or protector to be releasably mounted adjacent to the vehicle headlight.

Protectors for tail-lights can be of a number of different forms however in one configuration they comprise a generally planar plastics member which is secured to the tail-light lens or adjacent portion of the vehicle body by adhesive tape such as doubled sided adhesive tape.

It is common for the sake of aesthetic appearance to manufacture protectors or guards of the above type from a tinted plastics or acrylic material to provide, for example a smoke grey appearance. Whilst protectors and guards of this form may improve the appearance of a vehicle, the tint substantially reduces light transmission through the guard or protector which obviously is detrimental to safety and lighting efficiency.

Vehicle hood protectors and deflectors are designed to be used at the front of a vehicle, usually being secured to the vehicle hood. Hood protectors and guards of this type are intended to protect the front of the vehicle hood from damage, such as stone damage and may also be shaped so as to deflect debris, insects or the like over the vehicle windshield and hood and past the fenders. Hood protectors and guards are usually constructed of a thermoformed plastic or acrylic material and as with headlight and tail-light protectors, are often tinted. Whilst such devices function efficiently, they tend to cause in some instances reflection or refraction of sunlight and other light, for example from other vehicle headlights, towards the driver of the vehicle which obviously can cause distraction and lead to danger in certain circumstances.

Other similar vehicle accessories formed of shaped plastics material, such as side window visors are designed to allow driving with a window open adjacent to which the visor is mounted, whilst deflecting dust, wind and rain away from the vehicle. Visors of this type are also usually constructed of tinted plastics or of a transparent material. In the case of a tinted plastics material, the driver's view through the visor is reduced which therefore can create danger. The transparent guards, while allowing for improved viewing create problems with reflections and refraction.

Similar disadvantages also occur with rear window visors which, if of a tinted construction substantially, reduce visibility through a rear window or which if transparent, can create reflections.

The present invention aims to provide vehicle body accessories which have advantages over the prior art or which at least provide an alternative to the known vehicle body accessories and in particular to tinted vehicle accessories. The present invention further aims to provide vehicle body accessories which allow for a degree of light transmission but which also reduce or minimise light reflection or refraction encountered in current accessories.

The present invention aims in a further preferred aspect to provide vehicle body accessories which are of an aesthetically pleasing appearance.

Other objects and advantages of the invention will become apparent from the following description.

SUMMARY OF THE INVENTION

The present invention provides a vehicle body accessory, said accessory being formed of a transparent plastics material and characterised in that said accessory carries markings defining a repeating pattern of opaque and transparent regions in said accessory, said transparent regions permitting an uninterrupted passage of light through said accessory and said opaque regions blocking the passage of light through said accessory.

In one form the markings are provided on one side of the accessory to define the opaque and transparent regions in the accessory. In a particularly preferred form the marking is provided on the non exposed side of the accessory that is the side of the accessory adjacent to the vehicle body to which the accessory is mounted This ensures that the markings are not exposed directly to extended conditions and thus reducing the possibility of their being damaged or corrupted.

The markings may be such as to define a series of dots defining the transparent regions through the accessory. The dots may be arranged in rows which may extend horizontally, vertically or obliquely of the accessory. The dots may be of circular form, oval form, square form, hexagonal form, of complex form or in a combination of shapes.

When the dots are arranged in rows, they may be staggered, or aligned with each other in adjacent rows. Staggering of the dots allows for a higher density of dots per unit area and therefore allows for increased light transmission through the accessory.

Any other repeating pattern of markings may also be provided to define the opaque and transparent regions of the accessory. As an example the opaque regions may be defined by opaque dots of the shapes referred to above or of any other shape.

The marking pattern may be provided on the accessory, for example an a coating by screen printing or film deposition techniques on one side of the accessory. Alternatively the marking may be provided by laser imprint, image transfer methods, lithographic or similar ink printing process. In yet an alternative arrangement, the markings may be provided on a material, such as a transparent film, which is bonded to one side of the accessory.

In some applications, portions of the accessory may be left free of the pattern of markings to define enlarged transparent regions through the accessory for unimpeded transmission of light in those regions. This may occur, for example in direct alignment with a vehicle light source, for example a headlight lamp.

The proportion of the transparent to non transparent or opaque regions in the accessory may vary considerably. Typically, however, the proportion is such that there is light transmission through the accessory in the range of 20% to 60% with the most preferred range being 25% to 45%.

The vehicle body accessory may comprise vehicle headlight or tail-light guards, rear or side window visors, vehicle hood protectors or other similar accessories which normally are constructed from plastics such as sheet acrylic. The accessories may be thermoformed or shaped by alternative means to a desired form and configuration to suit the part of the vehicle to which they are applied.

BRIEF DESCRIPTION OF THE DRAWINGS

In order that the invention may be more readily understood and put into practical effect, reference will now be made to the accompanying drawings which illustrate a preferred embodiment of the invention and wherein:

FIG. 2 illustrates the headlight protector used with the vehicle of FIG. 1;

FIG. 3 illustrates a modified form of vehicle headlight protector according to the invention;

FIG. 4 illustrates a typical tail-light guard or protector for use on a vehicle;

FIG. 5 illustrates a modified form of the tail-light guard of FIG. 4;

FIGS. 6 and 7 illustrate alternative embodiments of the invention;

DETAILED DESCRIPTION OF THE EMBODIMENTS

Figure 1:
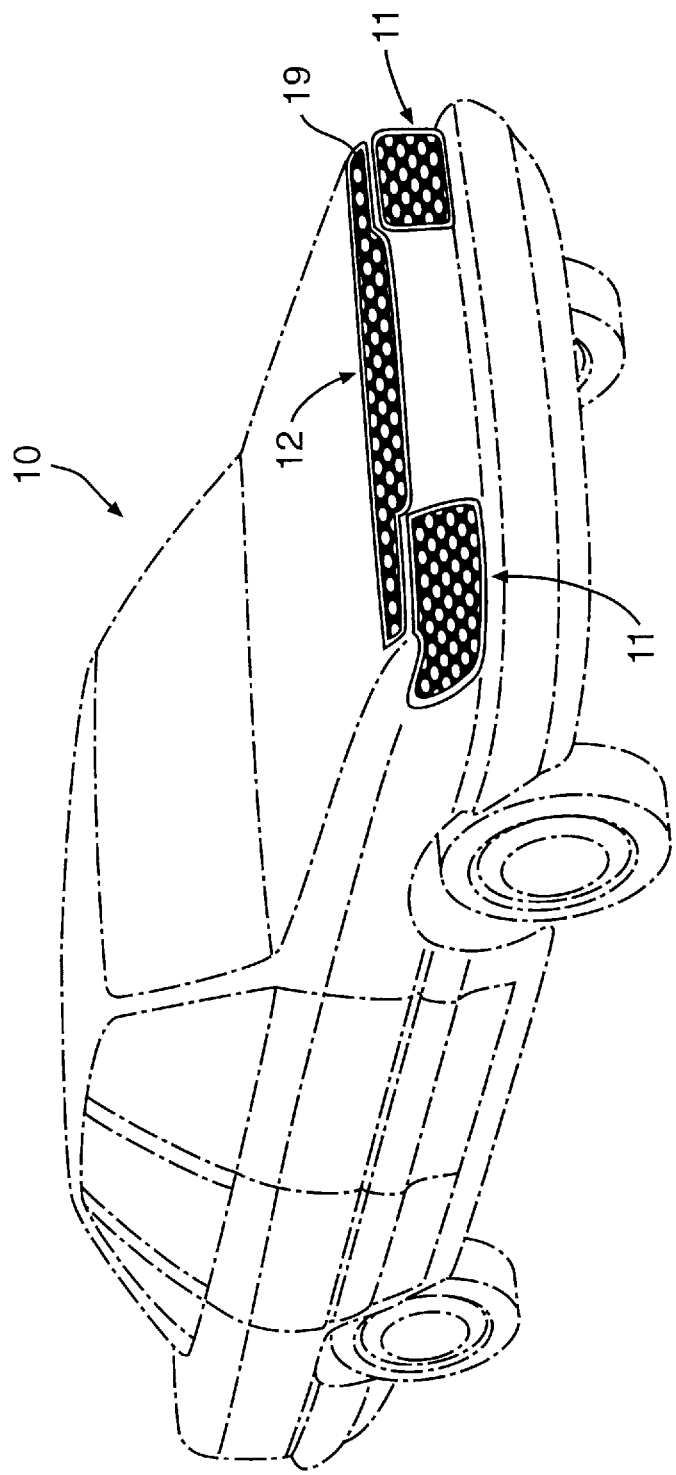
FIG. 1 illustrates in outline a vehicle provided with a headlight protectors and a hood protector according to the invention.
Figure 8:
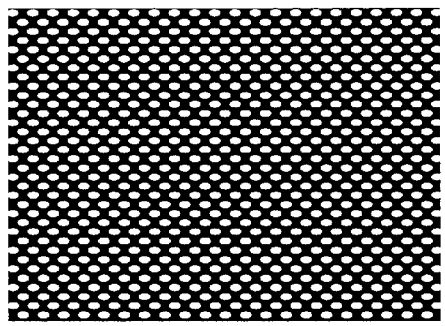
FIGS. 8 to 13 illustrate typical pattern markings which may be employed in the accessory of the invention.
Figure 9:
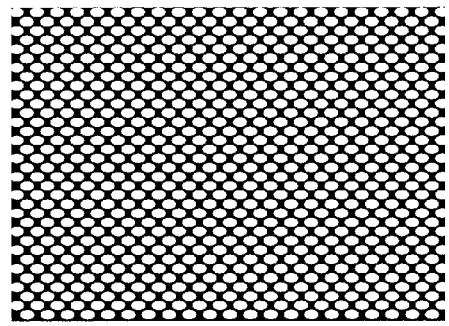

Referring to the drawings and firstly to FIG. 1, there is illustrated in outline a vehicle 10 provided with a pair of headlight protectors 11 and a hood protector 12 according to the present invention. The headlight protector 11 and hood protector 12 may, as is conventional in the art, be formed of transparent acrylic or similar impact resistant transparent plastics material and are shaped to match the part of the vehicle 10 to which they are applied. The headlight protectors 11 as shown in FIG. 2 include a main body portion 13 which is shaped such as to conform substantially to the vehicle headlight with which it is associated and in this embodiment includes clips 14 integrally formed with the main body portion 13 and which are designed for releasable engagement with the vehicle headlights, headlight surround or portion of the vehicle body so as to retain the protector or guard 11 in position adjacent to the headlight.

In accordance with an embodiment of the present invention one face, preferably the rear face 15 of the main body portion 13, is provided with markings which define a repeating pattern of transparent dots 16 through which light may pass uninterrupted. The dots 16 in this embodiment are arranged in rows extending longitudinally of the main body portion 13 of the protector or guard 10 but may be arranged in other configurations. Additionally, in this embodiment the markings are defined by screen printing the rear face 15 of the guard 11 in black such that the regions 17 of the protector or guard 11, other than the transparent regions 16 are of opaque form to blocks the passage of light through the protector or guard 11 in these regions.

If desired and as shown in FIG. 3, sections 18 of the body portion 13 in alignment with the headlight limps of the vehicle headlights may be left free of the markings. In this embodiment the vehicle headlight has double lamps and reflectors and the sections 18 are of circular form. The sections 18 are thus substantially transparent to allow for full transmission of light therethrough from the vehicle headlight lamps.

The markings as described above in FIG. 1 may also be applied to the vehicle hood protector 12 as shown in FIG. 1. As with the headlight protectors 11, the hood protector 12 has a main elongated body portion 19 which extends transversely of the vehicle and which is attached to the hood of the vehicle. The body portion 19 is marked on one side preferably on the side adjacent the vehicle in the same manner as occurs with the headlight protectors 11.

FIG. 4 illustrates a further embodiment of the invention applied in this case to a vehicle tail-light cover 20 which in this embodiment comprises a rectangular panel 21 of transparent acrylic or other impact resistant plastics and which may be secured to a vehicle or to the tail-light lens or surround by means of double sided tape 22 provided about the rear periphery of the panel 21. As with the headlight protector or guard 11, the panel 21 of the tail-light cover 16 is provided with a repeating pattern of markings 22 on its rear side. The markings 22 are generally of the same form as used with the vehicle headlight covers 11 to allow for a limited transmission of light (as described) through the protector or guard 20 from the vehicle tail lights, break lights or indicators, and define an opaque region framing the alternating pattern along the edges of the cover.

FIG. 5 illustrates a modified form of tail-light guard 23, similar to the embodiment of FIG. 4. In this case, however, selected regions 24 of the panel 21 of the guard or protector 23 are left free of the markings to allow for full transmission of light therethrough. Such regions 24 may be of any shape or configuration but in the embodiment illustrated are of elongated form extending in a generally diagonal direction. This arrangement in addition to allowing unimpeded light transmission through the guard 23 in the regions 24, more clearly defines the light emitting from the tail-lights, resulting in improved safety particularly in the case of the application of brake lights and/or indicator lights.

FIGS. 6 and 7 illustrate an application of the invention to side window visors 25 and 26, and a rear window visor 27, respectively. The side window visor 25 is mounted in a known manner adjacent the driver's window, whilst the visor 26 is mounted in a known manner adjacent a passenger window. As in the embodiments of FIGS. 1 and 4, the visors 25 and 26 carry a marking defining a repeating pattern of transparent and opaque regions. Similarly, the rear window visor 27 carries a repeating pattern of transparent and opaque regions. The markings in each case are preferably applied to the inner or non exposed faces of the visors.

FIGS. 8 to 13 illustrate typical marking patterns which may be applied to the vehicle body accessories described above. The patterns of FIGS. 8 and 9 comprise repeating patterns of circular dots defining transparent regions which are arranged in rows. The dots in each row are staggered relative to the dots in an adjacent row. The pattern of Fig. B allows a 25% light transmission, whilst that of FIG. 9, where the dots are larger, provides 40% light transmission.

Figure 10:
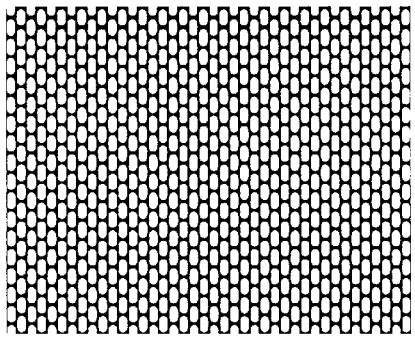

In the pattern of FIG. 10, the transparent dots are of parabolic or oval form again being arranged in rows, the dots in one row being staggered relative to the dots in adjacent rows to provide 44% light transmission.

Figure 11:
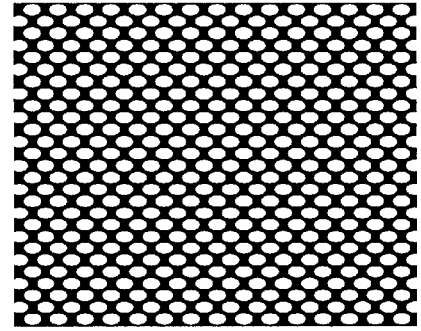

The "woven" pattern of FIG. 11 comprises dots of circular and square form in different rows respectively providing a 33% light transmission. Again the dots, in adjacent rows are staggered.

Figure 12:
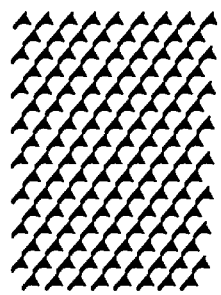
Figure 13:
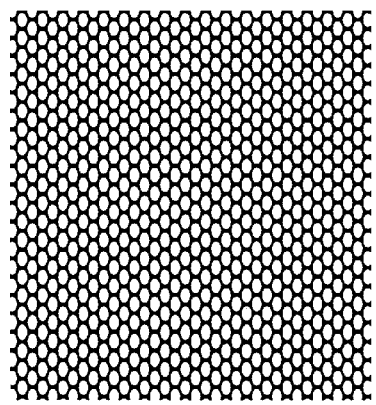

The pattern of FIG. 12 provides a greater light transmission and shows an example of a different form of marking not employing dote but rather repeating opaque portions. In this configuration, the opaque/non-opaque portions are arranged in pairs in a diamond configuration. The pattern of markings of FIG. 13 is similar to that of FIG. 10, comprising rows of oval dots in a staggered configuration providing a 40% lighter transmission.

The patterns of opaque/non-opaque regions described and shown in FIGS. 8 to 13 are examples only of the type of marking which may be employed in the accessories of the invention. Many other combinations of shapes and patterns may be provided to create a degree of opaqueness in the accessory whilst at the same time permitting a proportion of light to pass therethrough unimpeded. In one configuration, for example, the accessories may be provided on one side with a plurality of opaque dots or other markings which define therebetween transparent regions for the direct transmission of light. The opaque dots, as with the transparent dots, may take any configuration and either be joined or be separate.

Photometric testing has been undertaken to establish the light transmission and reflectance properties of panels carrying the patterns referred to above. Testing was carried out by the Photometric Laboratory of the Queensland University of Technology, a registered NATA testing authority. The testing was undertaken using samples of the marking pattern shown in FIG. 13 applied to a transparent plastic panel and compared with samples of clear or transparent plastic (designated G, H and I), light smoke plastic (designated A, B and C), and dark smoke plastic (designated D, E and F).

Figure 14:
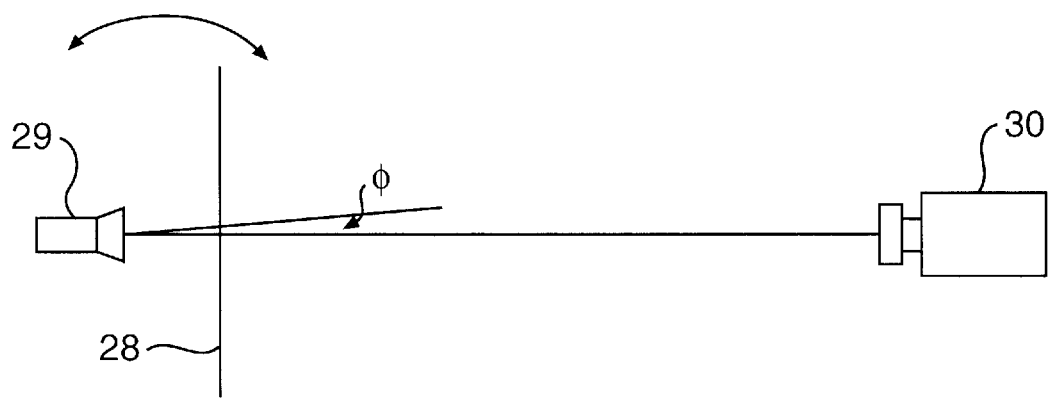
FIG. 14 and 15 illustrate respectively and schematically the testing apparatus for testing light transmission and reflectance of a typical marking pattern used in the accessory.

The testing apparatus for light transmission was set up as shown in FIG. 14 with each sample 28 located between a light source 29 and a light detector 30. The sample was located 75 mm from the light source 29 and 2000 mm from the light detector 30.

The light source comprised a laboratory tungsten filament lamp operating at Source A conditions (2856±50 K) and was mounted at the optical centre of the goniometer. This allowed accurate rotation of the light source 29 and samples 28 relative to the fixed detector 30. The detector 30 used, comprises a calibrated illuminance meter, known as a Spectra Spotmeter.

Readings were made at angles ($\phi$) of 0° (along the normal to the samples), 10° and 20° both to the left and right of zero (all angles were taken in the horizontal plane). Readings alternated between direct measurements without the sample 28 present and then with the sample 28 in place. In the case of the measurements on the pattern samples, readings were taken through four different parts of each of three samples, allowing an average of twelve readings to be obtained.

Test results for light transmission obtained from the above tests are set out in Table I below:

TABLE I

| Sample | | Detector Angle | | |
| --- | --- | --- | --- | --- |
| | | 0° | 10° | 20° |
| Clear | G | 92.0 (0.1) | 91.6 (0.4) | 91.5 (0.2) |
| | H | 91.7 (0.1) | 91.8 (0.1) | 91.6 (0.1) |
| | I | 91.8 (0.1) | 91.8 (0.2) | 91.7 (0.1) |
| Light | A | 51.4 (0.1) | 51.1 (0.2) | 50.6 (0.3) |
| Smoke | B | 51.4 (0.1) | 51.1 (0.2) | 50.6 (0.3) |
| | C | 57.1 (0.1) | 57.1 (0.2) | 56.3 (0.3) |
| Dark | D | 8.1 (0.1) | 8.0 (0.1) | 7.6 (0.1) |
| Smoke | E | 8.3 (0.1) | 8.2 (0.1) | 7.7 (0.1) |
| | F | 8.3 (0.1) | 8.1 (0.1) | 7.8 (0.1) |
| Pattern | all samples | 33.5 | 34.3 | 34.4 |

TABLE I

The detection readings given for the clear, light smoked and dark smoked samples are average percent light transmission measurements taken for each sample at each angle. The values given in brackets indicate the largest variation of any value from the average value.

The readings given for the pattern samples are averages over twelve readings (four from each sample) taken at random positions over the samples. Transmissions were found to vary from as high as 42% to as low as 25% at different locations through the pattern.

Figure 15:
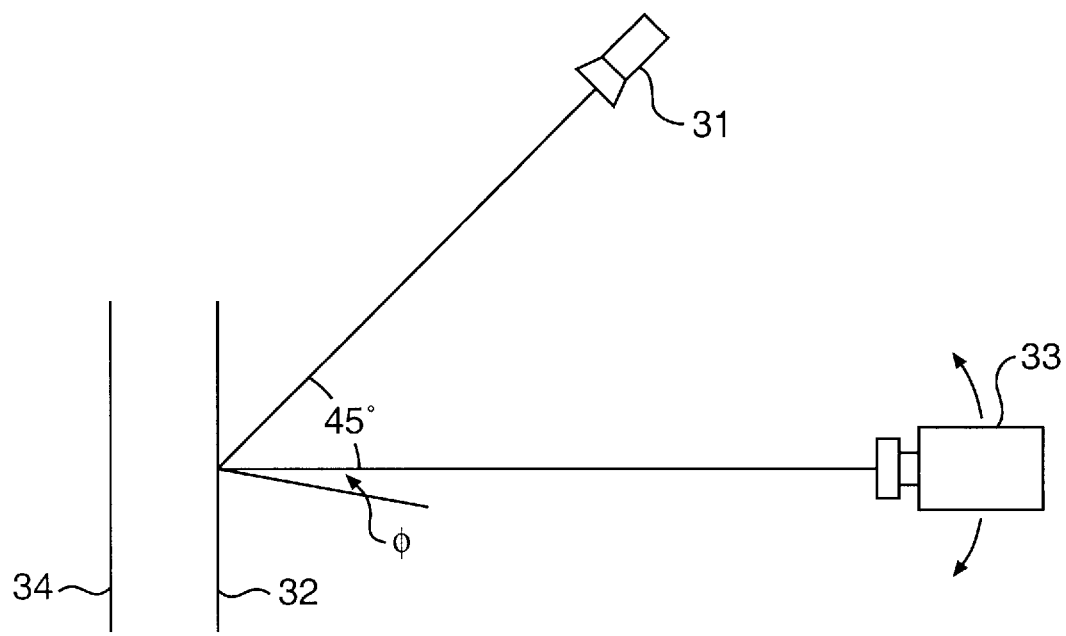

Further photometric tests for reflectance of the samples also undertaken with the apparatus set up in the manner shown in FIG. 15.

The light source 31 in this case comprises a focussed metal halide lamp mounted at an angle of 45° to the sample 32. The detector 33 was rotated to the required measurement angles ($\phi$) which were 0° along the normal to the sample 32 and ±20° about zero in the horizontal plane.

A black cloth 34 was suspended approximately about 300 mm behind the sample 32 to minimise background reflections.

The detector 33 used comprises Topcon BM-7 luminance/colorimeter. The detector 33 is calibrated at three monthly intervals against our primary standard lamps, which are calibrated by National Measurements Laboratory in Sydney.

A matt reflecting sheet placed at the position of the sample 32 has a reflectance of 82%. The corrected reflection for the sheet is obtained from measured reflection/0.82). Reflection for the samples was then determined as a ratio of the light reflected from the sample to the corrected reflection from the white matt reflecting sheet. Readings were alternated between these two surfaces.

The results of the reflectance tests are set out in Table II below:

TABLE II

| Sample | | Detector Angle | | |
| --- | --- | --- | --- | --- |
| | | 0° | 10° | 20° |
| Clear | G | 0.14 | 0.07 | 0.09 |
| | H | 0.13 | 0.06 | 0.06 |
| | I | 0.11 | 0.06 | 0.06 |
| Light | A | 0.07 | 0.04 | 0.04 |
| Smoke | B | 0.05 | 0.03 | 0.04 |
| | C | 0.05 | 0.03 | 0.03 |
| Dark | D | 0.32 | 0.28 | 0.32 |
| Smoke | E | 0.30 | 0.27 | 0.32 |
| | F | 0.29 | 0.28 | 0.31 |
| Pattern | all samples | 0.41 | 0.33 | 0.36 |

TABLE II

The readings given for the clear, light smoked, dark smoked and pattern samples are average percent light reflection measurements taken for each sample at each angle.

From the results of the test, the patterned of marked samples show a light transmission greater than the dark smoke plastics but less than clear and light smoke plastics. Tests for reflectance show that the pattern samples have greater reflectance than clear, light smoke or dark smoke samples.

These properties provide the benefits outlined above, that is an acceptable light transmission to allow for viewing therethrough and a reflectance which will minimise the problems of reflection of light towards the driver of a vehicle.

Whilst the above has been given by way of illustrative embodiment of the invention, all such modifications and variations thereto as would be apparent to persons skilled in the art are deemed to fall within the broad scope and ambit of the invention as herein defined in the appended claims.

We claim:

1. A headlight cover accessory for application to an automotive vehicle, comprising:

a sheet form body of form-sustaining, transparent clear plastic material having substantially unimpeded light transmissibilty, the sheet form body having a shaped contour and periphery to complement and fit to an exterior of a headlight of the vehicle to which it is to be applied, the sheet form body having an inner surface facing the vehicle body and an opposite outer surface;

mounting means for releasably securing the sheet form body to the vehicle; and a patterned coating having repetitive alternating transparent and opaque regions on one of the inner surface and the outer surface of the sheet form body, the patterned coating being visually observable at the outer surface of the transparent sheet form body while transmitting light so that the exterior part of the vehicle to which it is to be applied is visible through the clear plastic material of the sheet form body in the transparent regions of the patterned coating;

wherein the headlight cover has at least one section free of said patterned coating in a position of alignment with a lamp of the headlight to allow substantially unimpeded light transmission from the lamp through the headlight cover.

2. The accessory of claim 1 wherein said patterned coating permits the transmission of between 20% and 60% of impinging light through said accessory.

3. The accessory of claim 1 wherein said patterned coating permits the transmission of between 25% and 45% of impinging light through said accessory.

4. The accessory of claim 1 wherein the pattern of alternating transparent and opaque regions is defined by dots.

5. The accessory of claim 4 wherein said dots are arranged in rows.

6. The accessory of claim 5 wherein said dots in adjacent rows are staggered.

7. The accessory of claim 6 wherein said dots are of an oblong shape.

8. The accessory of claim 4, wherein the dots are polygonal.

9. The accessory of claim 4, wherein the dots define diamond shaped transparent regions.

10. The accessory of claim 1, wherein said means for securing the sheet form body to the vehicle is integrally formed with the sheet form body.

11. The accessory of claim 1 wherein said means for securing the sheet form body to the vehicle comprises integrally formed clips for releasable engagement with the vehicle body.

* * * * *